Dec. 5, 1961  C. P. BARNARD ET AL  3,011,700
ISODOSE PLOTTER
Filed Jan. 13, 1959  3 Sheets-Sheet 1

INVENTORS
CECIL P. BARNARD
JAMES O. BEAUMONT
BY
John W. Ralls
ATTORNEY

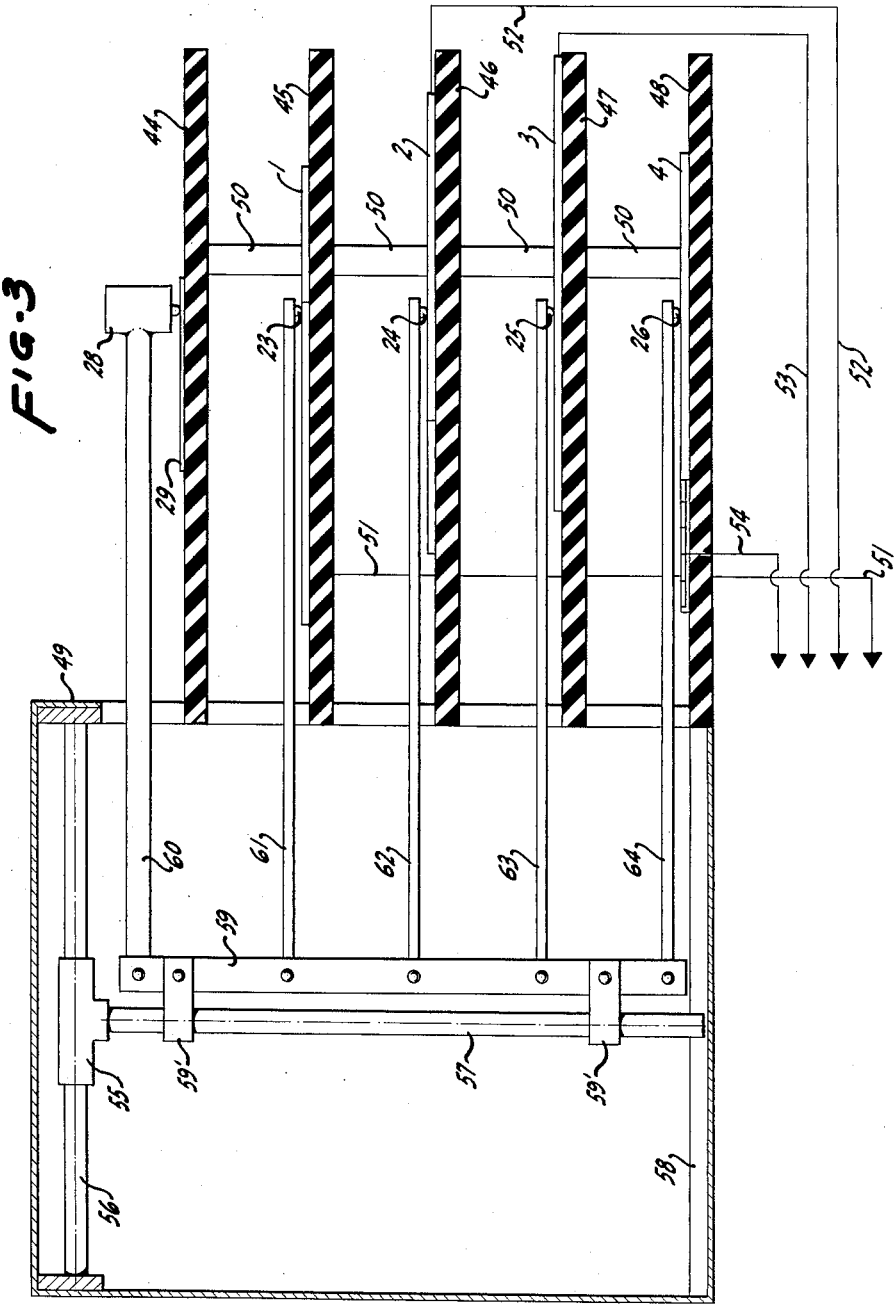

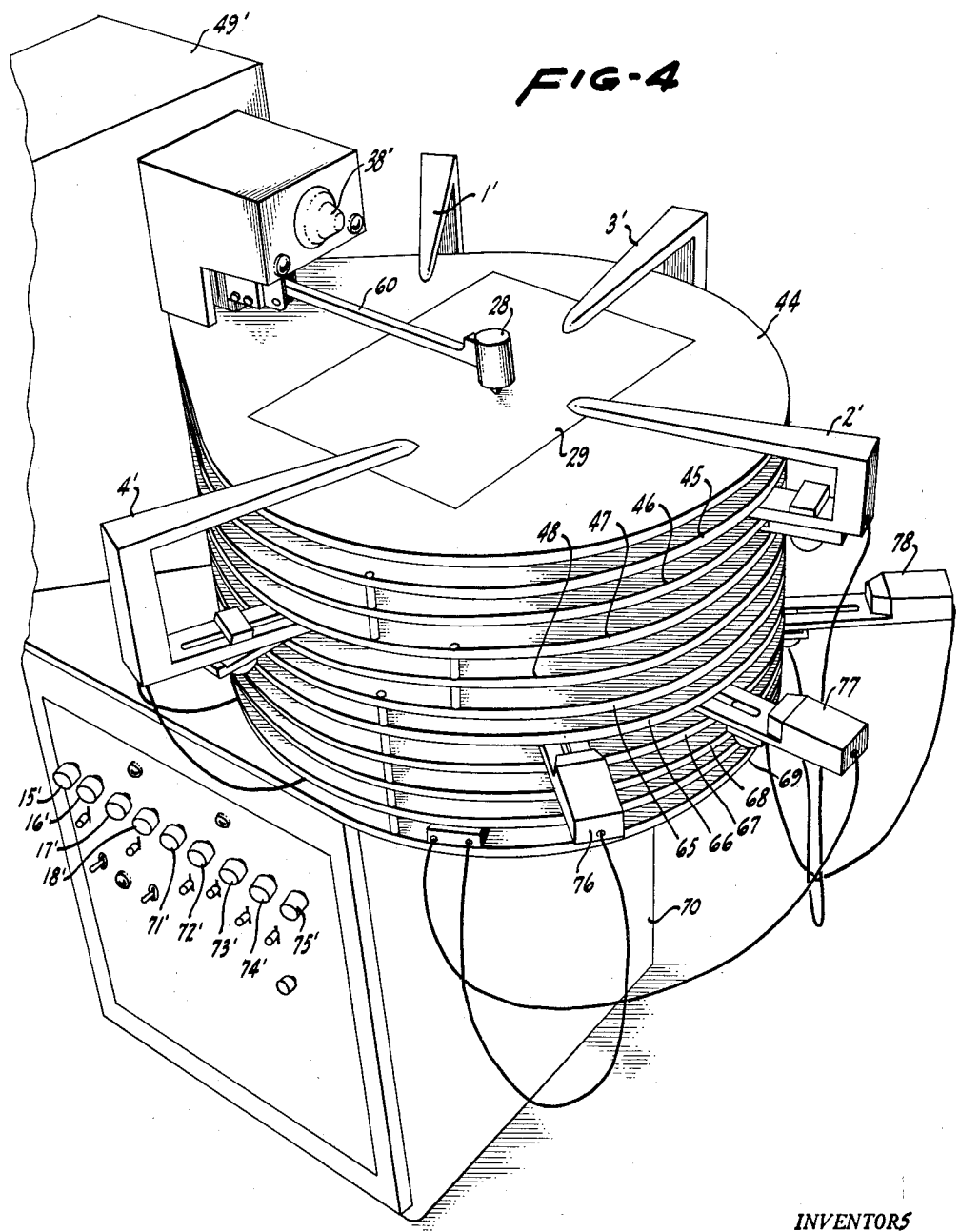

United States Patent Office 3,011,700
Patented Dec. 5, 1961

3,011,700
ISODOSE PLOTTER
Cecil P. Barnard, Campbell, and James O. Beaumont, Los Gatos, Calif., assignors to Vernon J. Pick, Saratoga, Calif.
Filed Jan. 13, 1959, Ser. No. 786,627
8 Claims. (Cl. 235—58)

This invention relates generally to analog computing apparatus for adding two-dimensional scalar functions, and relates in particular to an isodose plotter for semi-automatically producing a graphical representation of the radiation-dosage distribution through a selected section of the body resulting from a selected pattern of multiple-exposure radiotherapy.

In radiotherapy, it is often desired to establish a high-intensity radiation field throughout a specified internal region of a body while maintaining a relatively low dosage in surrounding tissue. This is generally accomplished by multi-port exposure, in which a plurality of radiation beams are directed toward a treated region from different directions, or by rotation in which either the patient or the radiation source is rotated about the region of interest. The latter is approximately equivalent to a number of beams, say eighteen, spaced at equal angles around the axis of rotation. The general problem at hand is the determination of an exposure pattern which will produce an appropriate dosage distribution through a selected section of the body.

The conventional, prior-art solution is a tedious manual technique of computing and plotting isodose contours, which is described and explained in an article by Patricia R. Steed, published in the Stanford Medical Bulletin, vol. 15, No. 3, August 1957, pages 152-158. Briefly, an outline of the selected body cross-section is drawn and an arbitrary number of points are marked thereon, one hundred or more points being required for an adequate plot. A tentative exposure program is assumed on the basis of experience, and computation begins.

A transparent beam-distribution overlay (an empirically determined single-port isodose plot) is placed over the body cross-section in the direction of the first beam, and positioned so that the surface line thereof corresponds to the skin position. The relative intensity at each point is read from the over-lay, multiplied by the assumed radiation from that beam, and recorded. The over-lay is moved to the position selected for the second beam, the operation is repeated, and so on, until each port has been taken care of.

The recorded values are then totalled for each point, the sums are plotted and isodose contours are sketched in. If the resulting pattern is not satisfactory, changes are made in the tentative program, the computation is repeated, and a new sketch of isodose contours is made. Since one plot represents a good man-day of effort, it is evident that the prior-art procedure is time-consuming and costly.

This invention provides a computer for semi-automatically plotting the isodose contours corresponding to any selected radiation pattern, whereby each plot requires but a few minutes. Instead of using transparent over-lays as in the prior technique, the computer of the present invention employs potential-distributing sheets each having a semi-conducting surface on which there is set up a two-dimensional distribution of electric potentials corresponding to the dosage distribution from a single-port exposure. These potential-distributing sheets are supported by a stack of vertically spaced and alined, horizontal platforms, so that the several sheets can be individually positioned according to the angular positions selected for different radiation beams, and the several sheets are supplied with voltages corresponding to the relative intensities of the several beams.

A sheet of paper or the like is supported on the top platform of the stack, and on this sheet of paper an outline of the body section which it is desired to treat can be drawn. Hence, when the apparatus has been set up, every point on the sketch of the body section is vertically alined with a point on each of the potential-distributing sheets, and the so-alined point on each sheet has an electric potential proportional to the radiation dosage which will be received by that point in the body from a respective one of the radiation beams if the tentative exposure program is carried out.

A vertical comb-like structure has an uppermost tooth extending horizontally over the sheet of paper supported on the top platform, and has additional teeth extending horizontally between the platforms and over the potential-distributing sheets supported thereon. This comb-like structure is supported so that the outer ends of said teeth can be moved in unison over the surfaces of the platforms.

An electrically operated marking device is attached to the outer end of the uppermost tooth for placing marks on the paper supported by the uppermost platform, and a plurality of potential probes are attached to the outer ends of the other teeth, so that when the marking device is brought over any selected point on the sketch representing the selected body section, the various probes contact alined points on the several potential-distributing sheets, and thereby each probe develops an electric potential proportional to the radiation dosage which that point of the body will receive from a respective one of the radiation beams.

All of the probes are electrically connected to an averaging circuit which derives the average potential of the probes, which is proportional to the total dosage received by the selected point of the body under the assumed radiation program. These potentials can be read off by means of a meter or the like, if desired.

Finally, a supply of adjustable reference potential is provided, which can be adjusted to the potential corresponding to any selected value of radiation dosage. An amplifying and relay circuit is connected to operate the marking device each time that the average potential derived by the averaging circuit equals the reference potential. Hence, if the marking device is moved over the surface of the sketch representing a body section, a series of marks will be made, each representing points on an isodose contour. By changing the reference potential to values representative of different dosage contours, a complete isodose contour plot can be made in a matter of a few minutes.

Although particularly useful in the plotting of isodose contours as herein explained, the computer here disclosed may also be employed advantageously for adding any other two-dimensional scalar functions that can be represented by two-dimensional distributions of electric potentials.

The invention may be better understood from the following illustrative description and the accompanying drawings. The scope of the invention is pointed out in the appended claims.

FIG. 1 of the drawings is a simplified schematic and circuit diagram of an exemplary embodiment of this invention;

FIG. 3 is a simplified and somewhat schematic vertical section illustrating the mechanical structure of the same embodiment;

FIG. 4 is a perspective view of a somewhat more elaborate embodiment.

Figure 1:
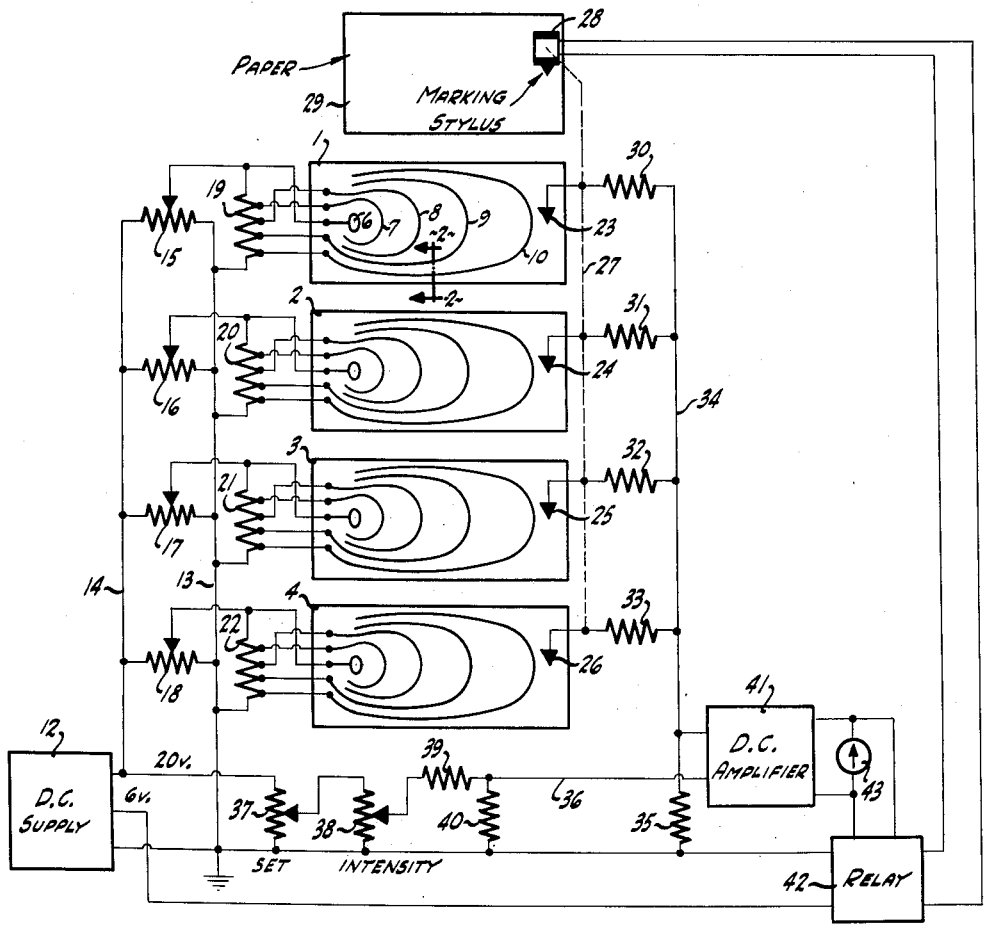
Figure 2:
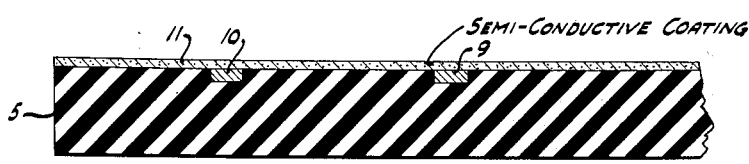
FIG. 2 is an enlarged fragmentary section taken along the line 2—2 of FIG. 1.

Referring to FIGS. 1 and 2, the isodose plotter there illustrated comprises a plurality of potential-distributing sheets, 1, 2, 3 and 4. One such sheet is provided for each radiation port to be employed in a selected pattern of multiple-exposure radiotherapy. Four such sheets are illustrated; it will be appreciated that any desired number of such sheets may be employed. Each of the potential-distributing sheets consists essentially of a base sheet 5 of insulating material having a flat upper surface on which are disposed a plurality of highly conductive metal strips 6, 7, 8, 9 and 10. Any desired number of the conductive strips may be employed on each of the potential-distributing sheets; five are illustrated, but in actual practice ten or more conductive strips per sheet may be employed. These conductive strips are disposed on, and may be pressed into the flat upper surface of base sheet 5, and they conform in shape and position to equipotential contours in the desired two-dimensional distribution of potentials over the surface of the potential-distributing sheet.

Since the desired distribution of electric potentials corresponds to the dosage distribution resulting from a single-port exposure, the conductive strips also have the same shapes and relative positions as the isodose contours corresponding to the selected port of the radiation source under consideration. For example, they may have the same shapes and relative positions as the isodose contours illustrated in FIG. 1 of the aforesaid article by Steed. The flat upper surface of sheet 5 between the aforesaid conductive strips is substantially covered by a semi-conductive coating 11. As herein used, semi-conductive refers to a material having a conductivity intermediate between that of good conductors, such as metals, and very poor conductors, such as good insulators, so that a substantial potential gradient can be established between different parts of coating 11 without the flow of excessive currents. Obviously, a variety of well-known materials having a wide range of conductivities may be employed for the semi-conductive coating; the principal, and somewhat contradictory requirements are that the current drain on the power supply not be excessive, and that the potential distribution be not excessively disturbed by the small currents drawn by the probes hereinafter described.

To achieve a smooth surface over which the probes may move, with good electrical contact to the conductive strips, the semi-conductive coating 11 may extend over the tops of strips 6–10 as shown in FIG. 2; however, this is not absolutely essential, and if desired the strips 6–10 may rest wholly on top of sheet 5, with the coating 11 filling the spaces between the strips and flush with the tops thereof.

Voltage is supplied to each of the potential-distributing sheets from a D.C. power supply 12. For example, in one embodiment of the invention supply 12 provides 20 volts D.C. between leads 13 and 14, and as a matter of convenience lead 13 is grounded. Bridged across leads 13 and 14 there are four potentiometers 15, 16, 17 and 18, one for each of the four potential-distributing sheets illustrated. Connected between lead 13 and the taps of respective potentiometers, as shown, there are four, resistance voltage-dividers 19, 20, 21 and 22. Each of these voltage-dividers is provided with as many taps as there are conductive strips in the associated potential-distributing sheet, and each of said taps is connected to one of said conductive strips so that appropriate potentials are supplied to each strip for maintaining it at the potential corresponding to its position in the desired potental distribution.

Hence, there is provided on the upper surface of each potential-distributing sheet a distribution of electric potentials wherein the conductive strips 6–10 establish equipotential contours having relative values determined by the positions of the five taps on the associated voltage dividers. Current flows from each strip to the next through the semi-conductive coating 11, and the resistance drop through the coating establishes a continuous graduation of potential between the strips, whereby a rather accurate two-dimensional distribution of electric potentials is provided on the upper surface of each potential-distributing sheet. Adjusting the tap of the associated potentiometer varies the total voltage supplied to each potential-distributing sheet, and thus provides means for setting variable parameters representing the relative intensities of the several radiation beams.

Four potential probes, 23, 24, 25 and 26, one for each of the four potential-distributing sheets, are ganged together for movement in unison as indicated by the broken line 27. These probes are so mounted that they can be moved, each in unison with the others, two-dimensionally over the surface of the corresponding potential-distributing sheet. The potential-distributing sheets 1, 2, 3 and 4, on the other hand, can be moved individually to different positions relative to the others in correspondence with various patterns of beam directions.

Also mounted for movement in unison with probes 23–26, there is an electrically operated marking device 28 which moves over the surface of a sheet of paper or the like 29. The marking device 28 may comprise a solenoid which moves a pen or other marking stylus into contact with paper 29 whenever the solenoid is energized.

The four potential probes are connected to an averaging circuit for developing the average potential thereof. In its simplest and most usual form the averaging circuit consists essentially of equal resistors 30, 31, 32 and 33 connected between lead 34 and respective ones of the potential probes, as shown. Preferably, lead 34 is also connected to ground through a resistor 35. It is evident that lead 34 assumes approximately the average potential of the four probes 23–26.

A reference potential of adjustable value is developed in lead 36 as follows: a potentiometer 37 is connected across the 20-volt power supply 12, as shown. Another potentiometer 38 is connected between the tap of potentiometer 37 and ground. Lead 36 is connected to the tap of potenticmeter 38 through a resistor 39, and is connected to ground through a resistor 40. It is evident that the reference potential developed in lead 36 depends jointly upon the settings of potentiometers 37 and 38. In practice, potentiometer 37 is generally adjusted to set or calibrate the apparatus, and potentiometer 38 is adjusted to establish the reference levels corresponding to the particular isodose contours which it is desired to plot.

The potential difference between leads 34 and 36 is applied to a direct-coupled amplifier 41, which amplifies this potential difference and supplies the winding of a relay 42. The contacts of relay 42 are connected between a 6-volt tap of power supply 12 and the solenoid of marking device 28, so that the marking device is operated each time that the average potential developed at lead 34 becomes equal to the reference potential supplied through lead 34. Additional visual indications are provided by a null-indicating instrument 43 connected across the output of amplifier 41.

In operation of the apparatus an outline of the body section to be treated is drawn upon the sheet of paper 29, and the relative positions of potential-distributing sheets 1–4 are adjusted in accordance with the beam pattern of a tentative radiation exposure program. Additionally, the potentiometers 15–18 are adjusted in accordance with the relative intensities of the respective radiation beams. Next, potentiometer 38 is adjusted to a value corresponding to one of the isodose contours which is to be plotted.

Now marking device 28 is moved about the surface of the paper 29, and in unison therewith the probes 23–26 move about on the surfaces of potential-distributing sheets 1–4. During the course of such movement each of the probes assumes a potential equal to the point on the potential-distributing sheet with which it is in contact, and hence proportional to the dosage which will be produced at the corresponding point of the body by exposure to a single radiation beam. Hence, the average potential of all the probes as developed in lead 34 is proportional to the total radiation exposure which the tentative exposure program will produce at the point under consideration.

Each time that the potential at lead 34 becomes equal to the potential at lead 36, relay 42 closes the circuit between power supply 12 and the solenoid of marking device 28, and the marking stylus of the marking device is brought into contact with the paper 29 to produce a small mark upon the paper. By moving device 28 about the surface of the paper 29, it is evident that a succession of such marks can be produced, forming in effect, a semi-continuous line which plots the position of one isodose contour.

Next, potentiometer 38 can be readjusted to a value corresponding to another of the isodose contours to be plotted, and the above procedure repeated to plot another of the desired isodose contours. In this manner a complete isodose contour chart can be made in a matter of a few minutes. After such a chart has been made, if the distribution of radiation within the body is not that desired, the potential-distributing sheets 1, 2, 3 and 4 can be shifted in their relative positions and the potentiometers 15–18 can be readjusted to establish a different tentative radiation program, and another isodose contour plot can be made within the matter of a few minutes. By this procedure an optimum radiation program can be established in a small fraction of the time and at a small fraction of the labor and expense heretofore required.

In the event that it is desired to determine the dosage at any particular point without making a complete contour plot, it is only necessary to move marking device 28 to the point in question, and adjust potentiometer 38 until a null indication is observed at instrument 43. The radiation dosage at that point can then be determined from the setting of potentiometer 38 at which a null is obtained.

A preferred mechanical arrangement for supporting the potential-distributing sheets and the potential probes is illustrated schematically in FIG. 3. This structure comprises a stack of five horizontal platforms 44, 45, 46, 47 and 48, disposed in vertically spaced and alined relation, as shown. Each of these platforms may be a flat sheet of insulating material. At one end the platforms are supported by attachment to a housing 49; at the other end they are supported by a pair of vertical posts 50, one of which is illustrated in the section view and the other of which is alined therewith on the other side of the sectioning plane. The uppermost of these platforms supports the sheet of paper 29, and the other four platforms support the four potential-distributing sheets 1, 2, 3 and 4. The potential-distributing sheets are connected through cables 51, 52, 53 and 54 to the electrical circuit, which are not illustrated in FIG. 3, but may be substantially as shown in FIG. 1.

Within housing 49, a sleeve 55 slidably mounted on a horizontal rod 56 supports a vertical shaft 57. The lower end of shaft 57 extends into a groove between a pair of guide rails 58, whereby the shaft 57 is held in a vertical position, but may move back and forth within housing 49 along the length of rod 56.

A vertical comb-like structure has an upright base portion 59 from which there extend horizontally a plurality of parallel teeth 60, 61, 62, 63 and 64. The upright portion 59 is attached to a pair of collars 59′ rotatively mounted on shaft 57, so that the comb-like structure as a whole can rotate to some extent about shaft 57 as an axis. Thus, by the combined sliding motion of sleeve 55 on rod 56, and the rotational motion of collars 59′ on shaft 57, the outer ends of teeth 60–64 can be moved in unison, two-dimensionally over substantially the entire surfaces of platforms 44–48.

The marking device 28 is attached to the outer end of the uppermost horizontal tooth 60, and the four potential probes 23–26 are attached to outer ends of the other four horizontal teeth, as shown. Preferably, the arrangement is such that the marking stylus of device 28 and the four probes 23–26 are maintained in vertical alinement. It is evident that the marking device 28, attached to the uppermost tooth 60 extending over the uppermost platform 44, can easily be moved by hand over the entire surface of the sheet of paper 29, and that the four potential probes 23–26, attached to the additional teeth extending between the platforms 45–48, will move in unison with the marking device, and in vertical alinement therewith, over the semi-conductive surfaces of potential-distributing sheets 1–4.

A somewhat more elaborate embodiment, representing a commercial form of the invention, is illustrated in FIG. 4. Five additional platforms 65–69 have been added to the stack for supporting additional potential-distributing sheets, whereby fairly complex radiation-exposure programs can be simulated. The mounting for supporting the comb-like structure in movable relation to the stack of platforms is contained in the modified housing 49′ which has upon its front the knob 38′ for adjusting potentiometer 38. Both the stack of platforms and the housing 49′ are mounted atop a cabinet 70 containing a major portion of the electrical circuits, and having mounted on its control panel nine knobs 15′–18′ and 71′–75′ for adjusting the nine potentiometers controlling the voltages supplied to the nine potential-distributing sheets. Such other switches and control device as may be desired are also provided on the front panel of cabinet 70.

The first four potential-distributing sheets 1–4 are attached to four U-shaped clamps 1′–4′ which can be clamped in the manner illustrated to the second through fifth from the top platforms of the stack. Each of these clamps has an upper finger that extends over the uppermost platform 44, as shown, which not only assists in holding the paper 29 in place but also assists in positioning the potential-distributing sheets in accordance with a selected orientation of the radiation beam. Additional potential-distributing sheets can be supported on platforms 65–69, each such sheet being preferably attached to a clamp of the type illustrated at 76, 77 and 78.

In its essentials, the computation of multi-port exposure dosage values amounts to adding a plurality of two-dimensional scalar functions, each of which is represented by a distribution of electric potentials on one of the potential-distributing sheets of the apparatus described. It is thus evident that the novel computer herein described can be used for adding any plurality of two-dimensional scalar functions that can be so represented by potential-distributing sheets of appropriate configurations.

Since numerous changes and modifications can be made without departing from the broader principles of this invention, it is intended that the invention should not be limited to the exemplary embodiment herein described. All intended limitations are expressed in the following claims.

What is claimed is:

1. Electrical apparatus for computing the sum of a plurality of two-dimensional scalar functions, comprising a plurality of sheets each having a semi-conductive surface, means for establishing on each of said surfaces a two-dimensional distribution of electric potentials corresponding to a respective one of the functions to be added, a plurality of potential probes movable two-dimensionally in unison over respective ones of said surfaces, an averaging circuit electrically connected to each of said probes for deriving the average potential thereof, and means connected to said averaging circuit for displaying a value proportional to said average potential at each two dimensional position of said probes on said surfaces, said value representing the sum of said functions at said two-dimensional position.

2. Apparatus as in claim 1, wherein each of said sheets comprises a base sheet of insulating material having a flat surface, a plurality of non-contacting strips of conductive material disposed on said surface and conforming to respective equipotential contours of the two-dimensional distribution to be established, connections for applying appropriate potentials to said strips, and a coating of semiconductive material substantially covering said surface between said strips.

3. Apparatus as in claim 1, additional comprising means supporting all of said probes for movement in unison, and means supporting said sheets in individually adjustable positions relative to one another.

4. Apparatus as in claim 3, wherein said means for displaying comprises an electrically operated marking device mounted to move in unison with said probes, means for supplying a reference potential of adjustable value, and means for automatically operating said marking device to produce a mark each time that said average potential becomes equal to said reference potential.

5. Apparatus as in claim 3, wherein said means supporting said sheets comprises a stack of horizontal platforms disposed one above the other in vertically spaced and alined relation, and said means supporting said probes comprises a vertical, comb-like structure having its teeth extending horizontally between said platform, said probes being attached to the outer ends of said teeth, and said comb-like structure being movable relative to said stack of platforms for moving the probes in unison over the conductive surfaces of said sheets.

6. Apparatus as in claim 5, wherein said means for displaying comprises a marking device attached to said uppermost tooth of said comb-like structure for movement in unison with said teeth, said marking device moving two-dimensionally over the upper surface of the uppermost platform of said stack.

7. In an isodose plotter for semi-automatically producing a graphical representation of the radiation dosage distribution through a section of the body resulting from selected patterns of multi-port exposure in radiotherapy, wherein the dosage distribution from each port is represented by a two-dimensional distribution of electric potentials on a sheet having a semi-conductive surface, the combination comprising a stack of horizontal platforms disposed one above the other in vertically spaced and alined relation for supporting said sheets, voltage supply means for supplying voltage to said sheets, a vertical comb-like structure having an uppermost tooth extending horizontally over the uppermost of said platforms, and having additional teeth extending horizontally between said platforms, means supporting said comb-like structure for two-dimensional horizontal movement of the outer ends of said teeth in unison over the surfaces of said platforms, an electrically operated marking device attached to the outer end of said uppermost tooth, a plurality of potential probes attached to the outer ends of respective ones of said additional teeth, an averaging circuit electrically connected to each of said probes for deriving the average potential thereof, potentiometer means for supplying a reference potential of adjustable value, and means for automatically operating said marking device each time that said average potential becomes equal to said reference potential.

8. An isodose plotter for semi-automatically producing a graphical representation of the radiation dosage distribution through a section of the body resulting from selected patterns of multi-port exposure in radiotherapy, comprising a plurality of potential-distributing sheets for establishing two-dimensional distributions of electric potentials corresponding to the dosage distributions resulting from respective single-port exposures, each of said potential-distributing sheets consisting essentially of a base sheet of insulating material having a flat surface, a plurality of metal strips disposed on said surface and conforming to equipotential contours of the two-dimensional distribution to be established, connections for applying appropriate potentials to said strips, and a semi-conductive coating substantially covering said surface between said strips, a stack of horizontal platforms disposed one above another in vertically spaced and alined relation for supporting said potential-distributing sheets in vertically spaced, parallel relation, each sheet being individually movable in a horizontal plane on its supporting platform to simulate different patterns of multi-port exposure, voltage supply means and connections for supplying voltage to said sheets, a vertical comb-like structure having an uppermost tooth extending horizontally over the uppermost of said platforms, and having additional teeth extending horizontally between said platforms, means supporting said comb-like structure for two-dimensional, horizontal movement of the outer ends of said teeth in unison over the surfaces of said platforms, an electrically operated marking device attached to the outer end of said uppermost tooth, a plurality of potential probes attached to the outer ends of respective ones of said additional teeth, an averaging circuit electrically connected to each of said probes for deriving the average potential thereof, potentiometer means for supplying a reference potential of adjustable value, an amplifier connected to amplify the difference between said average potential and said reference potential, and relay means connected to said amplifier and said marking device for operating said marking device each time that said average potential becomes equal to said reference potential.

References Cited in the file of this patent

UNITED STATES PATENTS

| 2,213,886 | Potter | Sept. 3, 1940 |
| 2,452,664 | Koenig | Nov. 2, 1948 |
| 2,542,490 | Ehrenfried | Feb. 29, 1951 |
| 2,683,563 | Lee et al. | July 13, 1954 |

OTHER REFERENCES

Stieber: Proc. of the Eastern Computer Conference (December 1957), pages 30–33 relied on.

Murray et al.: Journal of Scientific Inst., vol. 32 (December 1955), pages 481–483.

Helm et al.: Industrial Laboratories (September, 1953), pages 122–124.